US009491197B2

(12) United States Patent
Adachi

(10) Patent No.: US 9,491,197 B2
(45) Date of Patent: Nov. 8, 2016

(54) CONNECTION DETECTION APPARATUS AND IN-VEHICLE RELAY APPARATUS

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventor: Naoki Adachi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 238 days.

(21) Appl. No.: 14/309,673

(22) Filed: Jun. 19, 2014

(65) Prior Publication Data

US 2014/0380416 A1    Dec. 25, 2014

(30) Foreign Application Priority Data

Jun. 19, 2013 (JP) ................................. 2013-128812

(51) Int. Cl.
*H04L 29/06* (2006.01)
*H04L 29/08* (2006.01)

(52) U.S. Cl.
CPC ............... *H04L 63/20* (2013.01); *H04L 67/12* (2013.01)

(58) Field of Classification Search
CPC ............................... H04L 63/20; H04L 67/12
USPC ........................................................... 726/2
See application file for complete search history.

(56) References Cited

U.S. PATENT DOCUMENTS

| 2008/0157940 | A1* | 7/2008 | Breed | B60C 11/24 340/425.5 |
| 2009/0046538 | A1* | 2/2009 | Breed | B60C 11/24 367/93 |
| 2012/0089299 | A1* | 4/2012 | Breed | B60C 11/24 701/36 |

FOREIGN PATENT DOCUMENTS

| JP | A-2007-096799 | 4/2007 |
| JP | A-2011-255731 | 12/2011 |

OTHER PUBLICATIONS

Flexible OFDM Waveform for PLC/RF In-Vehicle Communications 2012 15th Euromicro Conference on Digital System Design; pp. 463-468 Date of Conference: Sep. 5-8, 2012.*
High-Speed Digital Transmitter Characterization Using Eye Diagram Analysis by Christopher M. Miller Aug. 1994 Hewlett-Packard Journal pp. 29-37.*

\* cited by examiner

*Primary Examiner* — Kambiz Zand
*Assistant Examiner* — Benjamin Kaplan
(74) *Attorney, Agent, or Firm* — Oliff PLC

(57) ABSTRACT

A connection detection apparatus in includes a gateway to which communication lines are connected, and which detects whether an unauthorized communication device has been connected to the communication lines. The gateway samples a signal several times from each of the communication lines, and generates waveform information, such as an eye pattern in which the waveforms are superimposed on one another. Furthermore, the gateway has stored therein normal waveform information, such as a mask generated based on the eye pattern at normal times. The gateway compares the generated waveform information with the stored waveform information, and recognizes that the waveform information is abnormal if it does not sufficiently match the normal waveform information. If the waveform information is abnormal, it is determined that an unauthorized communication device has been connected to one or more of the communication lines.

10 Claims, 5 Drawing Sheets

CONNECTION DETECTION APPARATUS AND IN-VEHICLE RELAY APPARATUS

BACKGROUND

The present invention relates to a connection detection apparatus for detecting connection of an unauthorized device to communication lines in a system in which a plurality of in-vehicle communication devices, which are installed in a vehicle, communicate with one another via the communication lines, and to an in-vehicle relay apparatus.

JP 2011-255731A discloses a method for detecting abnormality of an in-vehicle device, by calculating a return loss value of an electric wave transmitted from a detection antenna, based on forward power of the electric wave and reflected power of a received reflected wave, and comparing the waveform of the newly measured and calculated return loss value with a waveform of a return loss value stored in advance.

Furthermore, JP 2007-96799A proposes a monitoring apparatus that specifies and analyses the cause of an increase in load of a communication bus in an in-vehicle network by monitoring the communication state of the communication bus, and comparing the monitoring result of the communication bus with abnormal state information stored in advance, the abnormal state information indicating past communication states of the communication bus in which abnormalities occurred.

SUMMARY

However, in the abnormality detecting method disclosed in JP 2011-255731A, abnormality with respect to the in-vehicle device itself, such as theft of the in-vehicle device, can be detected, but not connection of an unauthorized device to a network in the vehicle. Furthermore, in the monitoring apparatus disclosed in JP 2007-96799A, there is the problem that, even when abnormality has occurred, the abnormality cannot be detected if it does not match the past abnormal state information stored in advance.

Electronic devices installed in recent vehicles have high functionality, and the number of the electronic devices installed in the vehicle has increased. Accordingly, information that is transmitted and received via a network of the vehicle is complicated, and includes, for example, highly-confidential information, such as private information of a user. If an unauthorized device is connected to the network of the vehicle for the purpose of unauthorized acquisition of that information, the private information will leak. The techniques disclosed in JP 2011-255731A and JP 2007-96799A cannot address such a case where an unauthorized device is connected to a network.

The present invention was made in view of such circumstances, and it is an object of embodiments of the present invention to provide (i) a connection detection apparatus that detects connection of an unauthorized device to a network of a vehicle, and (ii) an in-vehicle relay apparatus.

A connection detection apparatus according to various embodiments of the present invention is directed to a connection detection apparatus including: a waveform information acquiring unit that is connected to a communication line via which a plurality of in-vehicle communication devices communicate with each other, and is configured to acquire waveform information on signals that are transmitted and received via the communication line; a waveform information storage unit that has stored therein waveform information on a predetermined signal; and a connection detection unit configured to compare the waveform information acquired by the waveform information acquiring unit with the waveform information on the predetermined signal stored in the waveform information storage unit, and to detect, based on a comparison result, whether a device has been connected to the communication line.

Furthermore, in the connection detection apparatus according to various embodiments, the waveform information acquiring unit acquires waveform information several times, and the connection detection apparatus further includes: an eye pattern generation unit configured to generate, based on the waveform information that the waveform information acquiring unit has acquired collectively during the several times, an eye pattern in which multiple waveforms are superimposed on one another, wherein the waveform information storage unit has stored therein a mask generated for the eye pattern, the mask being generated based on the predetermined signal, and the connection detection unit is configured to compare the eye pattern generated by the eye pattern generation unit with the mask stored in the waveform information storage unit.

Furthermore, the connection detection apparatus according to various embodiments is such that the waveform information acquiring unit acquires waveform information on a ringing waveform on the communication line, the waveform information storage unit has stored therein waveform information on a predetermined ringing waveform, and the connection detection unit detects whether a device has been connected to the communication line, based on a result of comparison between the waveform information on the ringing waveform acquired by the waveform information acquiring unit and the waveform information on the predetermined ringing waveform stored in the waveform information storage unit.

Furthermore, the connection detection apparatus according to various embodiments is such that the waveform information is an amplitude or a convergence time of a ringing waveform.

Furthermore, the connection detection apparatus according to various embodiments further includes: a signal transmission request unit configured to request the in-vehicle communication devices connected to the communication line to transmit a signal, wherein the waveform information acquiring unit acquires waveform information on a superimposed signal obtained by superimposing multiple signals that were transmitted from the in-vehicle communication devices in response to the requests given by the signal transmission request unit.

Furthermore, in the connection detection apparatus according to various embodiments, the communication line comprises a plurality of communication lines, and the connection detection apparatus further includes: a communication relay unit that is connected to a plurality of communication lines, and is configured to relay communication between the plurality of communication lines, wherein the connection detection unit performs, on each communication line, the detection of whether a device has been connected, and the communication relay unit does not relay communication via the communication line for which the connection of a device has been detected by the connection detection unit.

Furthermore, the connection detection apparatus according to various embodiments further includes: a notifying unit configured to perform notification when the connection detection unit has detected the connection of a device.

Moreover, an in-vehicle relay apparatus according to various embodiments includes: a communication relay unit that is connected to a plurality of communication lines via which a plurality of in-vehicle communication devices communicate with each other, and is configured to relay communication between the plurality of communication lines; waveform information acquiring units each configured to acquire waveform information on signals that are transmitted and received via a respective one of the communication lines; a waveform information storage unit that has stored therein waveform information on a predetermined signal for each communication line; and a connection detection unit configured to compare the waveform information acquired by the waveform information acquiring unit with the waveform information on a predetermined signal stored in the waveform information storage unit, and to detect, based on the comparison result, whether a device has been connected to the corresponding communication line.

According to various embodiments, the connection detection apparatus connected to the communication lines, which constitute a network of a vehicle, detects whether an unauthorized device has been connected. Note that any one of the in-vehicle devices may have the function of the connection detection apparatus. For example, an in-vehicle relay apparatus such as the gateway to which a plurality of communication lines are connected and that relays communication between the communication lines may have the function of the connection detection apparatus.

The connection detection apparatus acquires waveform information on signals that are transmitted and received to and from the plurality of in-vehicle communication devices from the communication lines. Furthermore, the connection detection apparatus has stored therein in advance waveform information on a predetermined signal (for example, a signal that is transmitted or received in the state in which, for example, no unauthorized device is connected), The connection detection apparatus compares the waveform information acquired from the communication line with the stored waveform information, and detects, based on the comparison result, whether an unauthorized device has been connected.

When a new device has been connected to the communication lines of the network, a change will occur in an electric characteristic such as an impedance of the communication path, causing a change in the waveform, such as distortion, of a signal that is transmitted and received via the communication line. Accordingly, the connection detection apparatus can detect the connection of an unauthorized device by monitoring the signal waveforms on the communication line at regular intervals, and comparing the monitoring result with normal time signal waveforms.

Furthermore, in various embodiments, the connection detection apparatus acquires waveform information several times, for example, in a cyclic manner, and generates an eye pattern in which multiple waveforms are superimposed on one another. Furthermore, the connection detection apparatus has stored therein a mask generated based on a predetermined signal. The mask may be, for example, a set of thresholds that define the normal time signal waveform, acceptable changes in the waveform, and the like. The connection detection apparatus compares the generated eye pattern with the mask, and recognizes based on the comparison result that the waveforms are abnormal, if it can be determined that the eye pattern deviates from the normal waveform, and detects that a device has been connected to the communication line. Accordingly, the connection detection apparatus can detect the connection of the unauthorized device with accuracy.

Furthermore, in various embodiments, the connection detection apparatus acquires waveform information on a ringing waveform on the communication line together with a signal by communication. Furthermore, the connection detection apparatus has stored therein waveform information on a predetermined ringing waveform. The waveform information on a ringing waveform may be information on, for example, the maximum amplitude of the ringing waveform or a time period until the ringing is converged. The connection detection apparatus compares the acquired waveform information on a ringing waveform with the stored waveform information on a ringing waveform, and detects, based on the comparison result, whether an unauthorized device has been connected. Accordingly, the connection detection apparatus can detect the connection of an unauthorized device with a simple method.

Furthermore, in various embodiments, the connection detection apparatus requests the in-vehicle communication devices connected to the communication line to transmit a signal, and the in-vehicle communication devices each transmit, in response to the request, a signal to the communication line. The connection detection apparatus acquires waveform information on a signal obtained by superimposing, on the communication line, the signals transmitted by the in-vehicle communication devices, and detects, based on the acquired waveform information on the superimposed signal, whether an unauthorized device has been connected.

Furthermore, in various embodiments, the connection detection apparatus serves as a device that relays communication between the communication lines. The connection detection apparatus performs, on each communication line, the detection of whether an unauthorized device has been connected. The connection detection apparatus does not relay communication via the communication line for which the connection of an unauthorized device has been detected. Accordingly, the connection detection apparatus can prevent the connection of an authorized device from affecting the communication lines other than the communication line for which the connection of an unauthorized device has been detected.

Furthermore, in various embodiments, if the connection of an unauthorized device has been detected, the connection detection apparatus will perform notification. The notification may be performed by various types of methods, for example, output of a warning sound such as an alarm or a horn, output of a message on a display screen or the like in the vehicle, or message transmission to a user's cell phone or the like. With this, the user can recognize abnormality occurred in the vehicle.

According to various embodiments, waveform information obtained from a communication line is compared with predetermined waveform information stored in advance, and it is detected whether a device has been connected to a communication line, allowing highly accurate detection based on a change in an electric characteristic of the communication path caused by the connection of the device. It is thus possible to detect, with accuracy, the connection of an unauthorized device to a network of a vehicle.

DETAILED DESCRIPTION OF EMBODIMENTS

Embodiment 1

Figure 1:
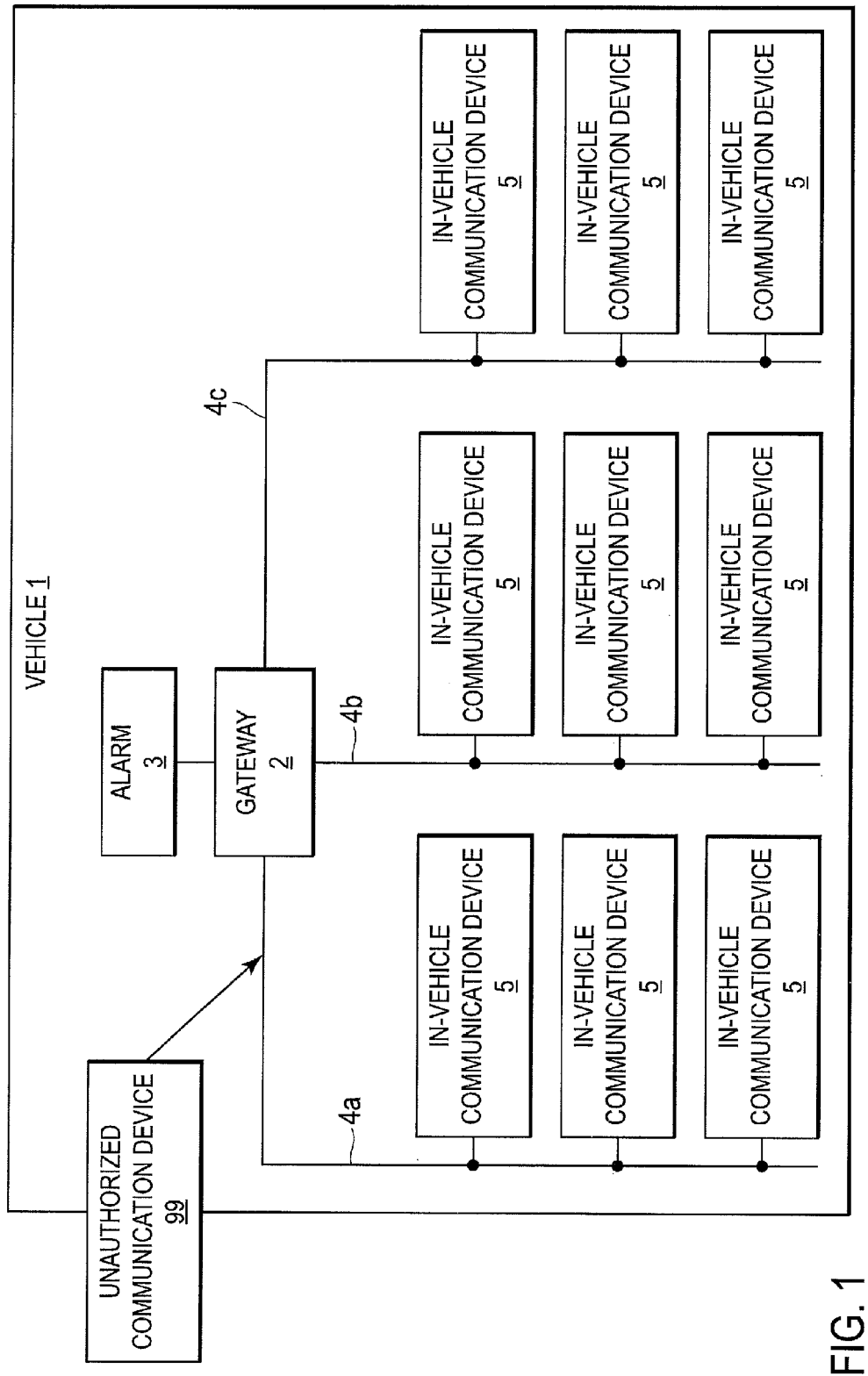
FIG. 1 is a block diagram illustrating a configuration of an exemplary in-vehicle communication system.

Hereinafter, various embodiments will specifically be described with reference to drawings. FIG. 1 is a block diagram illustrating a configuration of an exemplary in-vehicle communication system. In FIG. 1, reference numeral 1 denotes a vehicle, and a plurality of in-vehicle communication devices 5, such as Electronic Control Units (ECUs), are installed in the vehicle 1. The plurality of in-vehicle communication devices 5 are each connected to one of communication lines 4a to 4c that are arranged in the vehicle 1. In the depicted example, three in-vehicle communication devices 5 are connected to each of the communication lines 4a to 4c. Furthermore, the communication lines 4a to 4c are connected to a gateway 2.

The gateway 2 is a device that relays communication among the connected communication lines 4a to 4c. With this, each in-vehicle communication device 5 can communicate with not only the others of the in-vehicle communication devices 5 connected to the one of the communication lines 4a to 4c to which that in-vehicle communication device 5 is connected, but also with other in-vehicle communication devices 5 that are connected to the others of the communication lines 4a to 4c than the one to which that in-vehicle communication device 5 is connected, via the gateway 2. The in-vehicle communication devices 5, the gateway 2, the communication lines 4a to 4c, and the like constitute a network of the vehicle 1.

Furthermore, the gateway 2 according to the present embodiment has a function to detect connection of an unauthorized communication device 99 to the communication lines 4a to 4c. If the gateway 2 has detected the connection of the unauthorized communication device 99, the gateway 2 drives an alarm 3 and notifies a user of the vehicle 1 of the connection.

Figure 2:
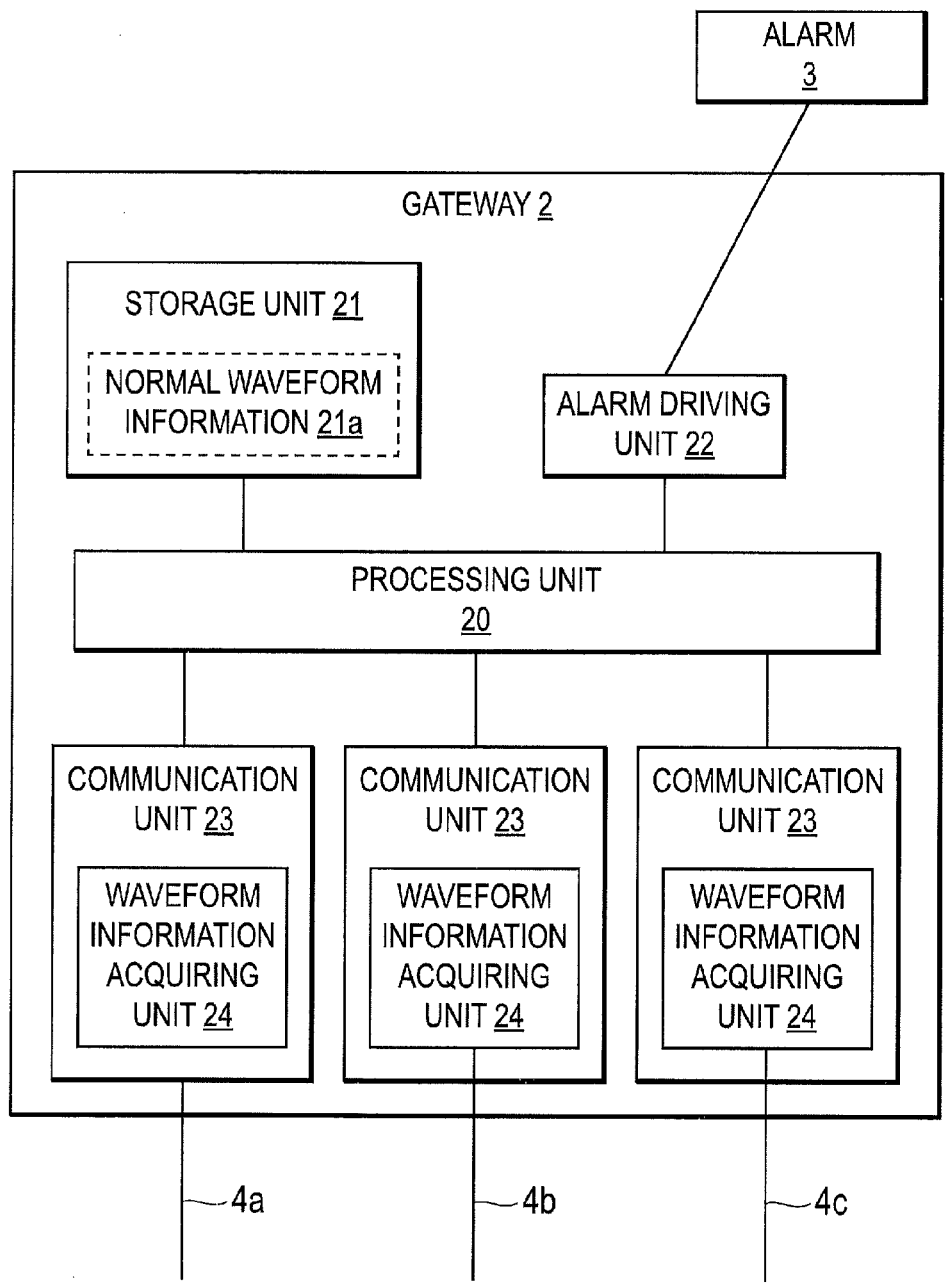
FIG. 2 is a block diagram illustrating a configuration of an exemplary gateway.

FIG. 2 is a block diagram illustrating a configuration of the gateway 2 according to the present embodiment. The gateway 2 includes a processing unit 20, a storage unit 21, an alarm driving unit 22, and a plurality of communication units 23. The processing unit 20 is, for example, an arithmetic processing unit, such as a Central Processing Unit (CPU) or a Micro Processing Unit (MPU), and performs various types of arithmetic processing by reading and executing programs stored in the storage unit 21 or the like. The processing unit 20 performs relay processing that transmits information received via one of the communication lines 4a to 4c to the others of the communication lines 4a to 4c. Furthermore, in the present embodiment, the processing unit 20 performs processing that detects connection of an unauthorized communication device 99 with respect to each of the communication lines 4a to 4c.

The storage unit 21 is configured using a non-volatile memory element such as a flash memory. The storage unit 21 has stored therein programs to be executed by the processing unit 20, data needed for processing performed by executing the programs, and the like. Furthermore, in the present embodiment, the storage unit 21 has stored therein normal waveform information 21a. The normal waveform information 21a is, although a detailed description thereof will be given later, information that indicates the waveform, at normal times, of signals that are transmitted and received via the communication lines 4a to 4c, and is used by the processing unit 20 for processing that detects the connection of an unauthorized communication device 99.

The alarm driving unit 22 is connected to the alarm 3, arranged in an appropriate place of the vehicle 1, via a signal line or the like. The alarm driving unit 22 outputs a drive signal to the alarm 3 in response to an instruction of the processing unit 20. The alarm 3 is driven in accordance with the drive signal from the alarm driving unit 22, and outputs a warning sound or the like.

In the present embodiment, the gateway 2 includes three communication units 23. Each communication unit 23 is connected to one of the communication lines 4a to 4c. The communication unit 23 communicates with the in-vehicle communication devices 5 installed in the vehicle 1 via the connected one of the communication lines 4a to 4c. The communication unit 23 communicates with the in-vehicle communication devices 5 based on a communication protocol such as, for example, Controller Area Network (CAN) or Local Interconnect Network (LIN).

Each communication unit 23 obtains, as a binary signal, an electric potential of a signal on the connected one of the communication lines 4a to 4c by sampling the electric potential of the communication line, and converts the binary signal into digital information, thereby receiving information transmitted from the in-vehicle communication devices 5. Each communication unit 23 supplies the received information to the processing unit 20. Furthermore, the communication unit 23 converts information that was supplied by the processing unit 20, and is to be transmitted, into a binary signal, and outputs the binary signal to the connected one of the communication lines 4a to 4c, thereby transmitting the information to the in-vehicle communication devices 5.

Furthermore, in the present embodiment, each communication unit 23 includes a waveform information acquiring unit 24. Each waveform information acquiring unit 24 acquires information that indicates the waveforms of signals that the in-vehicle communication devices 5 have output to the connected one of the communication lines 4a to 4c. In the present embodiment, each waveform information acquiring unit 24 samples a signal on the connected one of the communication lines 4a to 4c several times, and generates, as waveform information, an eye pattern (or eye diagram) in which waveforms of the sampled signals are superimposed on one another. The waveform information acquiring unit 24 supplies the generated eye pattern to the processing unit 20. The processing unit 20 performs processing that detects connection of an unauthorized communication device 99, based on the eye pattern supplied by the waveform information acquiring unit 24 and the normal waveform information 21a stored in the storage unit 21.

Figure 3:
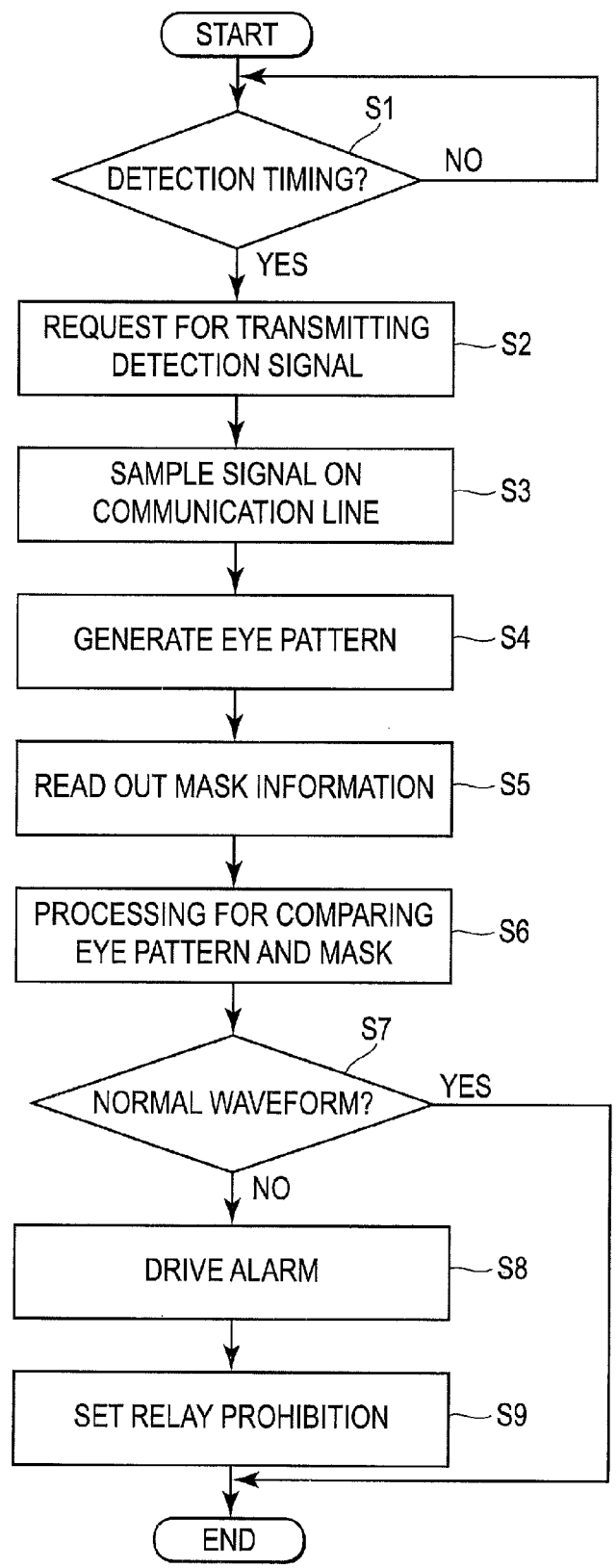
FIG. 3 is a flowchart illustrating exemplary processing that detects connection of an unauthorized communication device by the gateway.

The processing unit 20 performs processing that detects connection of an unauthorized communication device 99 to the communication lines 4a to 4c at a predetermined timing such as, for example, each time an ignition switch of the vehicle 1 is turned on, or at each predetermined period, e.g., every hour or every day. FIG. 3 is a flowchart illustrating exemplary processing that detects connection of an unauthorized communication device 99 by the gateway 2. The gateway 2 performs the connection detection processing for each of the communication lines 4a to 4c. The processing unit 20 of the gateway 2 determines whether it is time to perform the above-described detection (step S1), and if it is not yet time to perform the detection (No, in step S1), the processing unit 20 stands by until it is time to perform the detection.

If it is time to perform the detection (Yes, in step S1), the processing unit 20 causes each communication unit 23 to request the in-vehicle communication devices 5 connected to the corresponding one of the communication lines 4a to 4c to transmit a predetermined detection signal (step S2). Each in-vehicle communication device 5 that receives the signal transmission request outputs a detection signal having a predetermined pattern to the corresponding one of the communication lines 4a to 4c. The pattern of the detection signal may be of, for example, binary digits such as "0000010100111001011101111 . . . ", and may preferably be a signal pattern from which an eye pattern can easily be generated. The in-vehicle communication devices 5 that are connected to the same one of the communication lines 4a to 4c respectively output detection signals at a synchronized timing.

Figure 4:
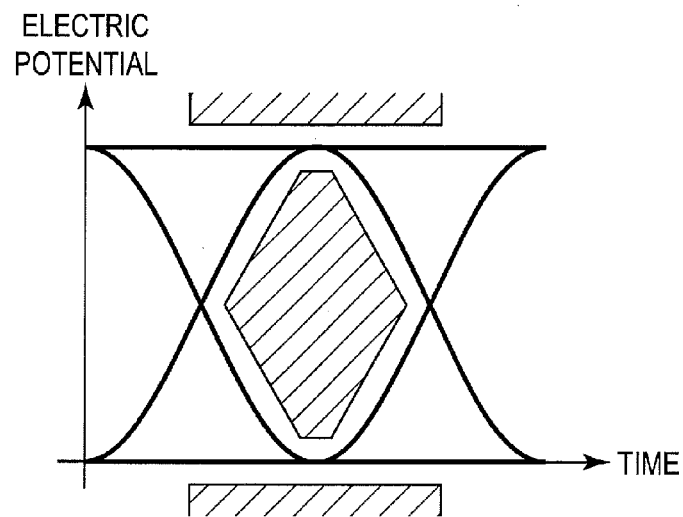
FIG. 4 is a pattern diagram illustrating an example of an eye pattern.

The processing unit 20 of the gateway 2 causes the waveform information acquiring units 24 of the communication units 23 to sample the signals on the communication lines (step S3). The waveform information acquiring units 24 generate eye patterns by superimposing waveforms of the sampled signals (step S4). FIG. 4 is a pattern diagram illustrating an example of the eye pattern. Note that FIG. 4 shows an ideal form of the eye pattern, but the eye pattern has actually a form that is more distorted than in the depicted example. The depicted eye pattern is an eye pattern in which the waveforms of three-bit signals "000", "001", "010", "011", "100", "101", "110", "111" are superimposed on one another. Furthermore, hatched areas of FIG. 4 are a mask that is to be stored in the storage unit 21 as normal waveform information 21a.

The processing unit 20, to which the eye patterns are supplied by the waveform information acquiring units 24, reads out, from the storage unit 21, information on a mask stored as the normal waveform information 21a (step S5). The processing unit 20 compares the eye patterns generated in step S4 with the mask read out in step S5 (step S6). The same mask may be used for each eye pattern, or a separate mask may be stored and read out for each eye pattern. For convenience, in the following description, reference will be made to a single mask. For the mask stored in the storage unit 21, areas are set that do not overlap with an eye pattern obtained in the normal state in which an unauthorized communication device 99 is not connected, that is, in the initial state of the communication system. Furthermore, the mask is set so as to have a margin to some extent, taking into consideration a possible change in the eye pattern due to temperature change or temporal change. Therefore, if there is no area in which an eye patterns obtained at the time of the detection processing and the stored mask overlap each other, it is possible to determine that the eye patterns are normal and that the waveforms of the signals on the corresponding one of the communication lines 4a to 4c are normal.

In contrast, when an unauthorized communication device 99 is connected to the communication lines 4a to 4c, an electric characteristic such as an impedance of the communication path may change, which may cause a change in the signal waveform, such as distortion. When the signal waveform has changed, the shape of the eye pattern generated by the corresponding waveform information acquiring unit 24 will change. As a result, an area will be created where the eye pattern and the mask overlap each other, and if so, it is possible to determine that the eye pattern is abnormal and that the waveforms of the signals on the corresponding one of the communication lines 4a to 4c are abnormal. That is to say, it is possible to determine that an unauthorized communication device 99 has been connected to the corresponding one of the communication lines 4a to 4c.

The processing unit 20 of the gateway 2 determines, based on the comparison result in step S6, whether the waveforms of the signals on the communication lines 4a to 4c are normal (step S7). If the waveforms of the signals are not normal (No in S7), the processing unit 20 instructs the alarm driving unit 22 to output a drive signal to the alarm 3 and to drive the alarm 3 (step S8), and the alarm 3 outputs a warning sound or the like and notifies the user. Furthermore, the processing unit 20 configures settings with respect to one of the communication lines 4a to 4c for which abnormality has been detected such that relay of communication between that communication line and the others of the communication lines 4a to 4c is prohibited (step S9), and the processing ends. If the waveforms of the signals on the communication lines 4a to 4c are normal (Yes, in S7), the processing unit 20 ends the processing without notification and relay prohibition.

In the in-vehicle communication system having the above-described configuration according to the present embodiment, the gateway 2, to which the communication lines 4a to 4c are connected, detects whether an unauthorized communication device 99 has been connected to the communication lines 4a to 4c. Each waveform information acquiring unit 24 of the gateway 2 samples the waveforms of signals from the connected one of the communication lines 4a to 4c several times, and generates an eye pattern in which the multiple waveforms are superimposed on one another. Furthermore, the gateway 2 has stored in the storage unit 21 a mask that is generated based on the eye patterns at normal times, as the normal waveform information 21a. The processing unit 20 of the gateway 2 compares the generated eye patterns with the stored mask, and if there is an area in which the eye patterns and the mask overlap each other, the processing unit 20 recognizes that the waveforms of the signals are abnormal and detects that an unauthorized communication device 99 has been connected to one or more of the communication lines 4a to 4c. Accordingly, the gateway 2 can detect the connection of an unauthorized communication device 99 to the communication lines 4a to 4c with accuracy.

Furthermore, the gateway 2 requests the in-vehicle communication devices 5 that are connected to the communication lines 4a to 4c to transmit a detection signal, and each in-vehicle communication device 5 transmits a detection signal to the corresponding one of the communication lines 4a to 4c in response to the request. Each waveform information acquiring unit 24 of the gateway 2 samples the detection signals that were transmitted by the in-vehicle communication devices 5 connected to the corresponding one of the communication lines 4a to 4c, and generates an eye pattern by superimposing waveforms of the sampled signals. With this, it is possible to collectively perform a process of determining the signal waveforms that were output by the in-vehicle communication devices 5 connected to one of the communication lines 4a to 4c.

Furthermore, the gateway 2 prohibits relay processing with respect to any of the communication lines 4a to 4c for which connection of an unauthorized communication device 99 has been detected. With this, it is possible to prevent the connection of the unauthorized communication device 99 from affecting the other communication lines 4a to 4c to which no unauthorized communication device 99 is connected. Furthermore, when the connection of an unauthorized communication device 99 has been detected, the gateway 2 drives the alarm 3 and notifies the user. Therefore, the user can recognize that an abnormality occurred in the vehicle 1.

Although the present embodiment is configured such that the gateway 2 of the in-vehicle communication system performs the processing that detects connection of an unauthorized communication device 99, the present invention is not limited to this configuration. For example, it is also possible that one of the in-vehicle communication devices 5 performs the connection detecting processing, and in this case, one in-vehicle communication device 5 of each of the communication lines 4a to 4c can perform the connection detecting processing. Alternatively, it is also possible that a plurality of devices in the in-vehicle communication system perform the connection detecting processing. For example, it is also possible that both the gateway 2 and one in-vehicle communication device 5 of each of the communication lines 4a to 4c perform the connection detecting processing. Alternatively, it is also possible that, for example, the gateway 2 and all the in-vehicle communication devices 5 perform the connection detecting processing.

Furthermore, although the gateway 2 is configured to drive the alarm 3 and perform notification when the connection of an unauthorized communication device 99 has been detected, the notification method is not limited to this. For example, the notification may be performed by various types of methods, such as a method in which a message is output to a display screen or the like provided in the vehicle 1, or a method in which a message is transmitted to a user's cell-phone or the like. Furthermore, although the gateway 2 is configured to prohibit relay of communication via one of the communication lines 4a to 4c for which connection of an unauthorized communication device 99 has been detected but to perform relay of communication via the others of the communication lines 4a to 4c, the present invention is not limited to this configuration. For example, a configuration is also possible in which, when connection of an unauthorized communication device 99 to any one of the communication lines 4a to 4c has been detected, the gateway 2 stops operation and performs no relay processing.

The eye pattern, the shape of the mask, and the like that are shown in FIG. 4 are examples, and the present invention is not limited to those. Furthermore, although the present invention has a configuration in which a plurality of in-vehicle communication devices 5 respectively transmit, in response to a request of the gateway 2, detection signals at a synchronized timing, and the gateway 2 obtains the waveforms in which the signals are superimposed, the present invention is not limited to this configuration. For example, the in-vehicle communication devices 5 may respectively transmit detection signals in a predetermined order or a random order, and the gateway 2 may obtain the waveforms of the signals from the in-vehicle communication devices 5 and perform connection detecting processing. In this case, the normal waveform information 21a for each in-vehicle communication device 5 is stored in the storage unit 21 of the gateway 2. Moreover, the technique shown in the present embodiment can be used not only for detecting the connection of an unauthorized communication device 99 to the communication lines 4a to 4c, but also for detecting one or more other types of communication abnormality.

Modification

Figure 5:
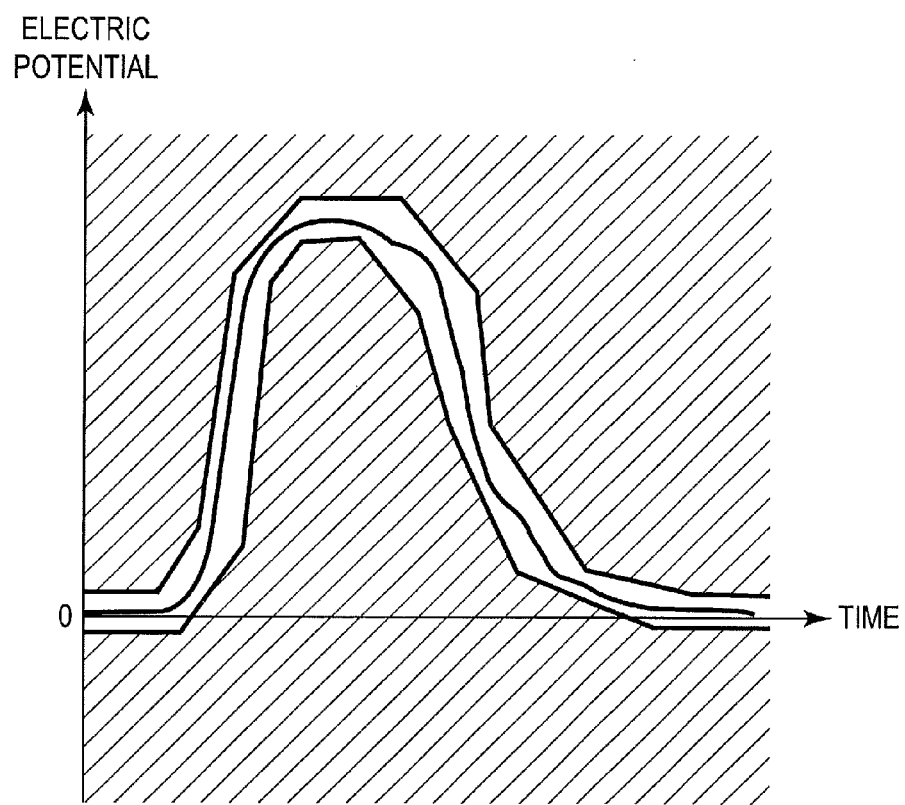
FIG. 5 is a pattern diagram illustrating connection detecting processing by the gateway according to a modification.

In the above-described embodiment, although a configuration is applied in which the gateway 2 performs detection by sampling signal waveforms several times to generate an eye pattern, and comparing the eye pattern with a mask, the present invention is not limited to this configuration. A gateway 2 according to a modification performs detection by comparing the signal waveforms obtained by each of the communication lines 4a to 4c with a mask without generating an eye pattern. FIG. 5 is a pattern diagram illustrating connection detecting processing by the gateway 2 according to the modification, and shows an example of the signal waveform obtained from one of the communication lines 4a to 4c and a mask.

For example, in response to a request from the gateway 2, the in-vehicle communication devices 5 transmit a detection signal having the pattern "010" to the corresponding one of the communication lines 4a to 4c. . The waveform information acquiring units 24 of the gateway 2 sample an electric potential of the corresponding one of the communication lines 4a to 4c and obtain the waveform of the detection signals of the pattern "010". In FIG. 5, the solid line denotes an example of the waveform acquired by the waveform information acquiring unit 24. Furthermore, the storage unit 21 of the gateway 2 has stored therein, as normal waveform information 21a, a mask for the pattern "010" in the normal state in which no unauthorized communication device 99 is connected. FIG. 5 shows, as an example of the mask, hatched areas.

The processing unit 20 of the gateway 2 compares the waveform information acquired by the waveform information acquiring unit 24 with the mask stored as the normal waveform information 21a in the storage unit 21, and determines, if there is no area in which the waveform and the mask overlap each other, that the signal waveform on the corresponding one of the communication lines 4a to 4c is normal. In contrast, if there is an area in which the waveform and the mask overlap each other, the processing unit 20 determines that the signal waveform is abnormal, and that an unauthorized communication device 99 is connected to the corresponding one of the communication lines 4a to 4c.

Accordingly, although the gateway 2 according to the modification is configured to perform, instead of comparison between an eye pattern and a mask, comparison between signal waveforms and a mask, it is also possible, similarly to the above-described embodiment, to detect connection of an unauthorized communication device 99 to the communication lines 4a to 4c with accuracy. Note that the signal waveform and the mask shown in FIG. 5 are examples, and the present invention is not limited to those examples.

Embodiment 2

Figure 6:
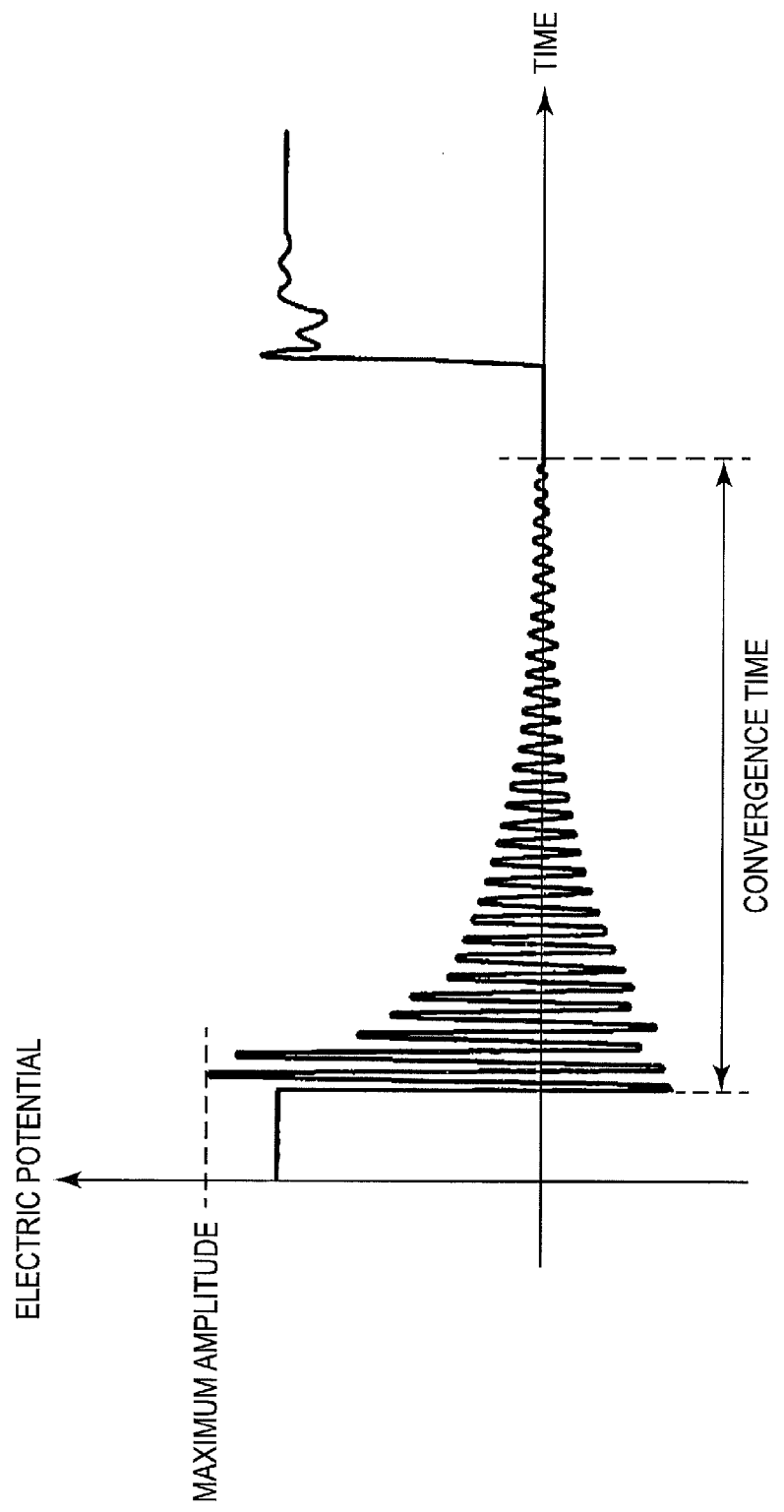
FIG. 6 is a pattern diagram illustrating an example of a ringing waveform.

A gateway 2 according to Embodiment 2 detects whether an unauthorized communication device 99 has been connected based on a waveform of ringing on the communication lines 4a to 4c due to communication of the in-vehicle communication devices 5. FIG. 6 is a pattern diagram illustrating an example of the waveform of ringing. Ringing is a state in which oscillation has occurred in the waveform due to, for example, reflection of a signal, and is generated when the signal changes and attenuates gradually. The depicted example is the waveform of ringing that occurs when a signal changes from "1" to "0".

When performing connection detecting processing, the gateway 2 requests in-vehicle communication devices 5 connected to the communication lines 4a to 4c to transmit a detection signal. In response to the request, each in-vehicle communication device 5 transmits a predetermined detection signal to the corresponding one of the communication lines 4a to 4c. . At that time, multiple in-vehicle communication devices 5 transmit detection signals at a synchronized timing. The detection signal may have a pattern "01010101 . . . . ", for example.

Each waveform information acquiring unit 24 of the gateway 2 acquires, as the waveform information, the maximum amplitude and a convergence time of the ringing waveform when a signal on the corresponding one of the communication lines 4a to 4c changes from "1" to "0", and gives the obtained waveform information to the processing unit 20. For example, the waveform information acquiring unit 24 samples a signal on the corresponding one of the communication lines 4a to 4c from when the signal has changed from "1" to "0" repeatedly in a cycle that is shorter than the cycle of ringing, and can define the maximum value of a plurality of electric potentials obtained by the sampling, as the maximum electric potential. Furthermore, the waveform information acquiring unit 24 determines that the ringing has converged when a plurality of electric potentials obtained by the sampling have changed to a threshold or less during a predetermined period, and can define, as the convergence time, the time period from when the signal has changed to "0" until when the ringing has converged.

The storage unit 21 of the gateway 2 has stored therein, as the normal waveform information 21a, information on ringing on the communication lines 4a to 4c in the normal state in which no unauthorized communication device 99 is connected. The normal waveform information 21a may be conditions that the maximum amplitude and the convergence time of the ringing waveform are to satisfy, for example, thresholds (upper and lower limit values) that define a range of the maximum amplitude.

The processing unit 20 compares the maximum amplitude and a convergence time of the ringing waveform acquired by waveform information acquiring unit 24 with the conditions that are stored in the storage unit 21 as the normal waveform information 21a, and determines whether the acquired maximum amplitude and convergence time satisfy the conditions. If both the maximum amplitude and the convergence time satisfy the conditions, the processing unit 20 determines that no unauthorized communication device 99 is connected to the corresponding one of the communication lines 4a to 4c. . If at least one of the maximum amplitude and the convergence time does not satisfy the conditions, the processing unit 20 determines that an unauthorized communication device 99 is connected to the corresponding one of the communication lines 4a to 4c, and performs processing for driving the alarm 3 and for prohibiting relay of communication, for example.

In the in-vehicle communication system according to Embodiment 2 having the above-described configuration, the waveform information acquiring unit 24 of the gateway 2 acquires waveform information on the ringing waveform on the corresponding one of the communication lines 4a to 4c due to signal transmission of the in-vehicle communication devices 5. The storage unit 21 of the gateway 2 has stored therein the normal waveform information 21a on the ringing waveform in the normal state in which no unauthorized communication device 99 is connected. The processing unit 20 of the gateway 2 compares the acquired waveform information on the ringing waveform with the stored normal waveform information 21a, and detects, based on the comparison result, whether an unauthorized communication device 99 has been connected. The waveform information on the ringing waveform may be, for example, the maximum amplitude and the convergence time, and the like. Accordingly, the gateway 2 can detect the connection of the unauthorized communication device 99 by a simple method.

Note that the present embodiment has a configuration in which the waveform information acquiring unit 24 acquires the maximum amplitude and the convergence time of the ringing waveform as the waveform information, but the present invention is not limited to this. For example, the waveform information acquiring unit 24 may be configured to acquire either the maximum amplitude or a convergence time, or may acquire other characteristics of the ringing waveform, as waveform information. Furthermore, the ringing waveform shown in FIG. 6 is an example, and the present invention is not limited to this.

Furthermore, the gateway 2 may be configured to perform both the detection using an eye pattern and a mask described in Embodiment 1, and the detection based on the ringing waveform described in Embodiment 2. In this case, if abnormality has been detected by at least one of the two detection methods, the gateway 2 can determine that the unauthorized communication device 99 has been connected to the communication lines 4a to 4c.

Furthermore, since the configuration of the in-vehicle communication system, the gateway 2, and the like according to Embodiment 2 is equivalent to the configuration of the in-vehicle communication system and the gateway 2 according to Embodiment 1, the same reference numerals are given to the same components and detailed descriptions thereof are omitted.

LIST OF REFERENCE NUMERALS

1 Vehicle
2 Gateway
3 Alarm
4a to 4c Communication lines
5 In-vehicle communication device
20 Processing unit (connection detection unit, signal transmission request unit, communication relay unit, notifying unit)
21 Storage unit (waveform information storage unit)
21a Normal waveform information
22 Alarm driving unit
23 Communication unit
24 Waveform information acquiring unit (eye pattern generation unit)
99 Unauthorized communication device

What is claimed is:
1. A connection detection apparatus comprising:
a waveform information acquiring unit that is connected to a communication line via which a plurality of in-vehicle communication devices communicate with each other, and is configured to acquire waveform information on signals that are transmitted and received via the communication line;
a waveform information storage unit that has stored therein waveform information on a predetermined signal;
a connection detection unit configured to compare the waveform information acquired by the waveform information acquiring unit with the waveform information on the predetermined signal stored in the waveform information storage unit, and to detect, based on a comparison result, whether an unauthorized device has been connected to the communication line; and
a prohibition unit that prohibits relay processing with respect to the communication line, if connection of an unauthorized communication device to the communication line has been detected.

2. The connection detection apparatus according to claim 1, wherein the waveform information acquiring unit acquires waveform information several times, the connection detection apparatus further comprising:
an eye pattern generation unit configured to generate, based on the waveform information that the waveform information acquiring unit has acquired collectively during the several times, an eye pattern in which multiple waveforms are superimposed on one another,
wherein the waveform information storage unit has stored therein a mask for the eye pattern, the mask being generated based on the predetermined signal, and
the connection detection unit configured to compare the eye pattern generated by the eye pattern generation unit with the mask stored in the waveform information storage unit.

3. The connection detection apparatus according to claim 2,
wherein the waveform information acquiring unit further acquires waveform information on a ringing waveform on the communication line,
the waveform information storage unit further has stored therein waveform information on a predetermined ringing waveform, and
the connection detection unit further detects whether a device has been connected to the communication line, based on a result of comparison between the waveform information on the ringing waveform acquired by the waveform information acquiring unit and the waveform information on the predetermined ringing waveform stored in the waveform information storage unit.

4. The connection detection apparatus according to claim 1,
wherein the waveform information acquiring unit acquires waveform information on a ringing waveform on the communication line,
the waveform information storage unit has stored therein waveform information on a predetermined ringing waveform, and
the connection detection unit detects whether a device has been connected to the communication line, based on a result of comparison between the waveform information on the ringing waveform acquired by the waveform information acquiring unit and the waveform information on the predetermined ringing waveform stored in the waveform information storage unit.

5. The connection detection apparatus according to claim 4,
wherein the waveform information is an amplitude or a convergence time of the ringing waveform.

6. The connection detection apparatus according to claim 1, further comprising:
a signal transmission request unit configured to request the in-vehicle communication devices connected to the communication line to transmit a signal,
wherein the waveform information acquiring unit acquires waveform information on a superimposed signal obtained by superimposing multiple signals that were transmitted from the in-vehicle communication devices in response to the requests given by the signal transmission request unit.

7. The connection detection apparatus according to claim 1, wherein the communication line comprises a plurality communication lines, further comprising:
a communication relay unit that is connected to the plurality of communication lines, and is configured to relay communication between the plurality of communication lines,
wherein the connection detection unit performs, on each communication line, the detection of whether a device has been connected, and
the prohibition unit prohibits the communication relay unit from relaying communication via the communication line for which the connection of an unauthorized device has been detected by the connection detection unit.

8. The connection detection apparatus according to claim 1, further comprising:
a notifying unit configured to perform notification when the connection detection unit has detected the connection of an unauthorized device.

9. An in-vehicle relay apparatus comprising:
a communication relay unit that is connected to a plurality of communication lines via which a plurality of in-vehicle communication devices communicate with each other, and is configured to relay communication between the plurality of communication lines;
waveform information acquiring units each configured to acquire waveform information on signals that are transmitted and received via a respective one of the communication lines;
a waveform information storage unit that has stored therein waveform information on a predetermined signal for each communication line; and
a connection detection unit configured to compare the waveform information acquired by the waveform information acquiring unit with the waveform information on a predetermined signal stored in the waveform information storage unit, and to detect, based on a comparison result, whether an unauthorized device has been connected to the corresponding communication line; and
a prohibition unit that prohibits relay processing with respect to the corresponding communication line, if connection of an unauthorized communication device to the corresponding communication line has been detected.

10. A connection detection method comprising;
storing, in a storage unit, waveform information on a predetermined signal;
acquiring waveform information on signals that are transmitted and received via a communication line via which a plurality of in-vehicle communication devices communicate with each other;
comparing the acquired waveform information with the waveform information on the predetermined signal stored in the waveform information storage unit, and detecting, based on a comparison result, whether an unauthorized device has been connected to the communication line; and
prohibiting relay processing with respect to the communication line, if connection of an unauthorized communication device to the communication line has been detected.

* * * * *